Dec. 20, 1960 H. C. LEE 2,965,710

TELEVISION APPARATUS

Filed Nov. 3, 1958

WITNESSES

Edwin E. Baasler

James F. Young

INVENTOR

Hon C. Lee

BY Benjamin DeWitt

ATTORNEY

United States Patent Office
2,965,710
Patented Dec. 20, 1960

2,965,710

TELEVISION APPARATUS

Hon C. Lee, Cranford, N.J., assignor to Westinghouse Electric Corporation, East Pittsburgh, Pa., a corporation of Pennsylvania Filed Nov. 3, 1958, Ser. No. 771,436
7 Claims. (Cl. 178—6.8)

This invention relates to sampling and desampling circuits, and relates more particularly to sampling and desampling circuits for high definition television systems.

In television systems, samplers at transmitters have been used to sample each of several different channels of information during very short intervals, the samples being interlaced in a predetermined sequence before transmission. At a receiver, a desampler synchronized with the sampler at the transmitter, reforms the samples and distributes them to channels corresponding to the channels at the transmitter.

In the past, extremely narrow pulses have generally been used for sampling. Disadvantages of such narrow pulses are: (1) Loss of information in the frequency band $w_s/2$ to $w_s$ where $w_s$ is the fundamental frequency of the sampling. As will be shown later, distortionless reproduction of a high definition signal using narrow pulses can only be obtained if the pulses have zero pulse width. In practice, it is difficult if not impossible to produce such a pulse train. It can be shown that the case of increasing pulse width corresponds exactly to the case of transmitting the interlaced information at reduced amplitude followed by loss of information in the reproduced signal at a receiver. (2) Inadequate control of the amplitude of the interlaced information. In practice, it might be desirable to transmit the interlaced material at reduced amplitude in order to reduce the undesirable effect due to spurious information inherent in the desampling process. This, of course, could be achieved by changing the width of the sampling pulses at the transmitter, but this is undesirable at the receiver as pointed out in the foregoing. The percentage change of pulse width, therefore, is limited.

It has also been proposed, as disclosed in the U.S. Patent No. 2,691,764, to simulate narrow pulse sampling with wide pulses having flat tops and bottoms. This has the disadvantages that (1) pre-setting of the D.C. level of the sampling wave is necessary, and (2) relatively expensive, square wave, sampling pulse and desampling pulse generators are required.

It can be shown that for distortionless reproduction of high definition signals, the sampling and desampling pulses ideally should have zero pulse width. A pulse having substantially zero pulse width is hereinafter referred to as an impulse. Impulse sampling means that a high definition signal is being sampled by a train of pulses having very nearly zero pulse width, and impulse desampling means that the sampled high definition signal is desampled by a train of pulses having very nearly zero pulse width. A train of such impulses can be represented by a Fourier series. Because of the frequency limitations existing in a picture tube of a television receiver, only the first two terms of this Fourier series need to be considered. In mathematical form, the two terms can be represented by a function $(1+2 \cos w_s t)$. The same distortionless reproduction of high definition signals as can be obtained with impulse sampling and desampling, can be obtained if the original high definition signal is modulated by a function $(1+2 \cos w_s t)$ at the transmitter, and then demodulated by the same function at the receiver.

By inspection of the function $(1+2 \cos w_s t)$, it can be seen that there should be a direct path for the input signal, and another path which will provide the necessary modulation.

This invention overcomes the disadvantages of prior sampling and desampling systems by using sinusoidal pulses to simulate impulse sampling and desampling. It is well known that a doubly balanced modulator (i.e. both the carrier and input signal are balanced) when properly adjusted, provides no direct path for the input signal, and that its output contains mainly the product of the input signal and the carrier. This invention uses a partially doubly balanced modulator consisting of a pair of similar, push-pull connected vacuum tubes, operating class A. A sinusoidal sampling carrier is applied to two corresponding grids of the tubes, 180° out-of-phase. The information signal is divided by a phase splitter into two signals, one of which is applied directly to another grid of one of the tubes, and the other of which is applied through an attenuator to a corresponding grid of the other tube. This modulator will simulate a function $(a_0+a_1 \cos w_s t)$, where $a_0$ represents a direct path for the input signal, and $a_1 \cos w_s t$ represents the modulated term. The constants $a_0$ and $a_1$ are determined by adjustment of the attenuation constant $k$, and the operating conditions of the tubes. By adjusting the attenuation constant $k$, a ratio of $a_1/a_0$ of 2 can be obtained. Thus, the function $(1+2 \cos w_s t)$ can be obtained.

An object of the invention is to simulate impulse sampling with sinusoids.

Another object of this invention is to provide improved samplers and desamplers for high definition television.

Another object of this invention is to use partially doubly balanced modulators for sampling and desampling.

This invention will now be described with reference to the annexed drawings, of which:

Figure 1:
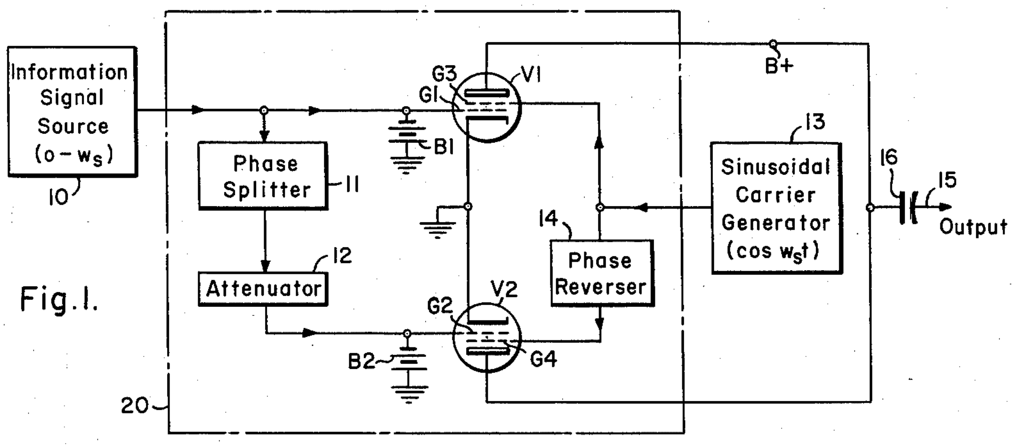
Fig. 1 is a circuit schematic of a partially doubly balanced modulator embodying this invention.

Referring first to Fig. 1, the partially doubly balanced modulator used in Figs. 2 and 3 will be described. A pair of similar vacuum tubes V1 and V2 have their cathodes connected together and to ground. A source of intelligence signals 10 supplies a signal directly to grid G1 of the tube V1, and through phase splitter 11 and attenuator 12 to a corresponding grid G2 of the tube V2. The grids G1 and G2 are biased negatively by the batteries B1 and B2 respectively, for class A operation of the tubes V1 and V2. A sinusoidal carrier generator 13 supplies a sine wave carrier signal directly to grid G3 of the tube V1, and through phase reverser 14 to corresponding grid G4 of the tube V2, the carrier signal being delivered 180° out-of-phase to corresponding grids of the two tubes. The plates of the two tubes are tied together and connected to B+, and deliver a modulated output, which is the product of the intelligence signal and the function $(1+2 \cos w_s t)$, through coupling capacitor 16 to modulated signal output connection 15.

This invention is particularly characterized by the fact that amplifier devices V1 and V2 are operated class A, and that attenuation is provided in the intelligence signal path between source 10 and the output of amplifier V2.

When the attenuation constant $k$ is 1, the ratio $a_1/a_0=\infty$, and the modulator will operate as a conventional doubly balanced modulator. When $k$ is 0, the modulator operates as a one tube modulator in which the ratio $a_1/a_0$ is a constant determined by the operating condition of the tube V1.

Figure 2:
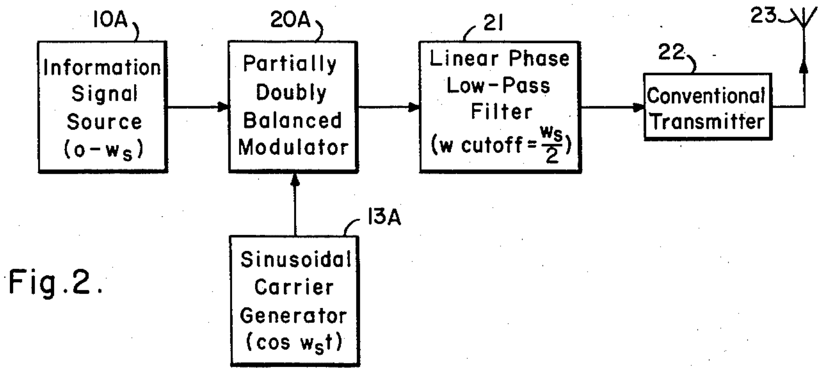
Fig. 2 is a block diagram of a television transmitter embodying this invention.
Figure 3:
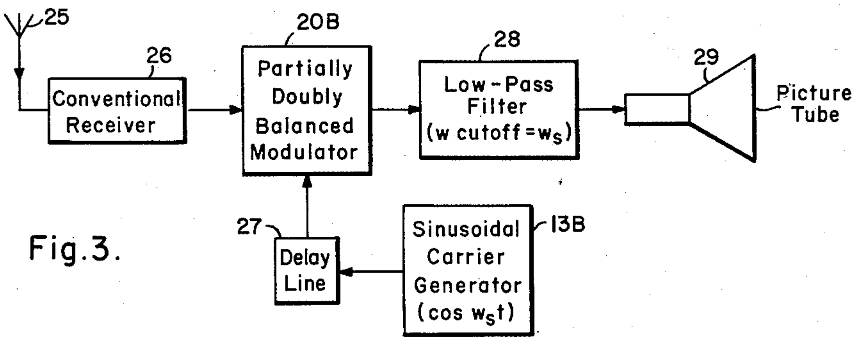
Fig. 3 is a block diagram of a television receiver embodying this invention.

In Fig. 1, the circuit and circuit components within the dashed-line rectangle identified by the reference numeral 20 comprise one exemplary embodiment of a partially doubly balanced modulator as used in Figs. 2 and 3.

If the attenuator 12 of Fig. 1 were omitted, the modulator would be a doubly balanced modulator but would not suffice for this invention. Including the attenuator 12, the modulator 20 is a partially doubly balanced modulator, and simulates the function $(a_0+a_1 \cos w_st)$ for a sinusoidal carrier. $a_0$ and $a_1$ are determined by adjustment of the constant $k$ of the attenuator, and the operating conditions of the tubes V1 and V2. By adjusting $k$, the ratio $a_1/a_0$ of 2 can be obtained so that the function $(1+2 \cos w_st)$ is obtained, and the sampler simulates impulse sampling.

At the transmitter of Fig. 2, partially doubly balanced modulator 20A includes amplifier devices and other components such as shown by way of example in the modulator 20 of Fig. 1. A high definition signal source 10A corresponding to the source 10 of Fig. 1, and a sinusoidal carrier generator 13A corresponding to the generator 13 of Fig. 1 are connected to the modulator 20A. The output of the modulator 20A is supplied through a linear phase, low-pass filter 21 to a conventional transmitting system consisting of conventional transmitter 22 and transmitting antenna 23. The filter 21 has a cut-off frequency of $w_s/2$. With the high definition signal from the source 10A occupying a frequency band from 0 to $w_s$, the output of the filter 21 will contain two kinds of information. First, the original information in the frequency band 0 to $w_s/2$ which is transmitted in normal sequence, and second, the folded back information resulting from sampling the original information in the frequency band $w_s/2$ to $w_s$ which is transmitted as interlaced material.

These two kinds of information may be understood more clearly by consideration of a video frequency, $w$, being multiplied by the operator of the partially balanced modulator, $(1+2 \cos w_st)$. If this is done, three terms representing three distinct frequencies will result:

$$(1+2 \cos w_st)(\cos wt)=\cos wt +\cos (w_s-w)t+\cos (w_s+w)t$$

where the video frequency $w$ is always less than the sampling or carrier frequency $w_s$. The low-pass filter will pass only frequencies below $w_s/2$. Consequently, the sum frequency, $(w_s+w)$, will be rejected and only one of the other two terms will be passed depending on whether $w$ is greater or less than $w_s/2$. When $w$ is less than $w_s/2$, only the first term $\cos wt$, will be passed. When $w$ is greater than $w_s/2$ then the second term, $\cos (w_s-w)t$, which is less than $w_s/2$ will be transmitted and the first term, $\cos wt$, will be discarded.

In general, the information bearing video signal simultaneously includes components having frequencies ranging from zero to at least $w_s$. Accordingly, the output derived from modulator 20A via filter 21 contains (1) a first set of components in the band from zero to $w_s/2$ representative of the low frequency portion of the video signal, and concurrently (2) a second set of components resulting from multiplication of the video signal by the second term of the modulator function, i.e., $2 \cos w_st$.

These two sets of components, or two kinds of information differ in another significant way. If the output of the low-pass filter increases in frequency as the video frequency is increased, this output must be the result of the first term in the operator and is conveniently termed the "straight through" component. Conversely, if the output frequency decreases as the video frequency increases, this is the result of the second term in the operator and conveniently may be referred to as the "folded back" information.

Assuming, for example, that a "sampling" frequency of 8 mc. is provided by generator 13A and if the information bearing video signal is a pure 2 megacycle sine wave, then the modulator 20A will produce:

(1) $\cos wt$=2 megacycle video,
(2) $\cos (w_s-w)t$=6 megacycle subcarrier sideband,
(3) $\cos (w_s+w)t$=10 megacycle subcarrier sideband.

Since the filter 21 attenuates everything above one half the subcarrier or "sampling" frequency, i.e. 4 mc., only the 2 mc. video component will be passed through to transmitter 22.

If, on the other hand, the video signal from source 10a contains a 5 mc. video information component, the modulator 20A would produce:

(1) a "straight through" video component of 5 mc.,
(2) a "lower subcarrier sideband" component at 3 mc., and
(3) an "upper subcarrier sideband" component at 13 mc.

Since the filter 21 cutoff is $w_s/2$ (or 4 mc. in the example used) only the lower subcarrier sideband (at 3 mc.) would be passed by the filter and applied as modulation to transmitter 22.

In summary, assuming an 8 mc. subcarrier or "sampling" frequency as in the foregoing example, a video component from source 10 having a frequency of 2 mc. will be transmitted "straight through" as conventional video and the subcarrier modulation products at 6 mc. and 10 mc. will be discarded. A video signal component having a frequency higher than $w_s/2$, e.g. five megacycles, will be handled differently: the "straight through" video component will be rejected by filter 21, and the "folded back" sideband, $\cos (w_s-w)t$, will be passed at a nominal frequency of 3 mc., with the frequency of the "folded back" component decreasing as the frequency of the original video component increases.

It will be obvious to those skilled in the art that the assumed subcarrier frequency of 8 megacycles as used in the foregoing example is not essential to the present invention. The subcarrier signal provided by generator 13 may have any convenient frequency which will permit the video frequency band from 0 to $w_s/2$ to be contained within the predetermined restricted bandwidth to be utilized by the system. Specifically, to use the present invention for transmission of high definition television image signals the subcarrier frequency should be chosen so that $w_s/2$ is equal to or less than the 4.25 megacycle per second video bandwidth of the television system presently adopted in the United States. Further, the subcarrier frequency advantageously may be chosen to be an odd multiple of one-half the television line scanning frequency or an odd multiple of one-quarter the line scanning frequency. By so choosing the subcarrier frequency the "folded back" sideband components are interleaved with the "straight through" low frequency video components in a manner similar to the well known technique used in the transmission of the composite color signal as presently standardized by the Federal Communications Commission.

At the receiver of Fig. 3, the signal transmitted by the transmitter of Fig. 2, is picked up by receiving antenna 25, and supplied through conventional receiver 26 to partially doubly balanced modulator 20B, which is also supplied with a sinusoidal local carrier through delay line 27 from generator 13B. The output of the modulator is supplied through low-pass filter 28 to picture tube 29. The filter 28 has a cut-off frequency equal to $w_s$. The delay line 27 delays the local desampling carrier by an interval sufficient to correct for the phase error in the upper band $w_s/2-w_s$ which is introduced by the desampling process.

The receiver of Fig. 3 would have a conventional circuit which is not shown, for synchronizing the local desampling carrier generator 13B with the sampling carrier generator 13A of Fig. 2.

It may be preferred, depending upon operating conditions, to reduce the ratio $a_1/a_0$ below 2 in the sampler by readjusting the attenuation constant $k$ in order to reduce the undesirable effect due to the folded-over information appearing in the lower band $0—w_s/2$. In doing this, loss of amplitude in the recovered upper band $w_s/2—w_s$ can be made up by increasing the ratio $a_1/a_0$ above 2 in the desampler 20B.

In the modulator of Fig. 1, the ratio $a_1/a_0$ cannot be made less than a minimum value fixed by the operating condition of the modulator tubes as previously described. In order to provide a range for $a_1/a_0$ from that minimum value to zero, it is only necessary to remove the phase splitter 11 of Fig. 1, converting the modulator to singly balanced operation. The amount of the product term between the input signal and the carrier can be controlled in this way by adjusting the attenuation constant $k$ because the carriers applied to the two modulator tubes are 180° out-of-phase. Thus the systems shown by Figs. 1–3 can have complete control of the relative amplitudes at their outputs between the information in the band $0—w_s/2$ and that in the band $w_s/2—w_s$.

Among the advantages of this invention are: (1) Sinusoidal waveform for sampling rather than short, or wide, square wave pulses, is used. It is more economical to generate a sinusoidal waveform than short, or wide, square wave pulses. For high definition TV, the same result can be obtained as for impulse (zero width pulse) sampling. (2) Complete control of the amplitude of the interlaced information. As previously described, the ratio of $a_1/a_0$ can be adjusted by changing the attenuation constant $k$. This ratio can be varied from infinity ($k=1$) to a value fixed by the operating condition of the modulator tubes. It can be reduced to zero by omitting the phase splitter of Fig. 1. By taking advantage of this ability to adjust the ratio $a_1/a_0$, the loss of amplitude in the unfolded band ($w_s/2$ to $w_s$) due to the transmission of the interlaced information at reduced amplitude, can be made up by increasing the ratio $a_1/a_0$ above 2 in the desampler at the receiver. This cannot be accomplished in prior art desamplers.

While the present invention has been described with reference to a particular embodiment only, it will be obvious to those skilled in the art that it is not so limited but is susceptible of various changes and modifications without departing from the spirit and scope thereof. For example, the amplifier devices V1 and V2, though shown as vacuum tubes, alternatively may comprise semiconductor amplifiers or, other known signal amplification devices. Likewise the attenuator 12 may be supplanted, within the scope of this invention, by any of various known circuit arrangements for supplying intelligence signals having a predetermined amplitude ratio to the control electrodes G1 and G2.

What is claimed is:

1. A modulator, comprising a pair of similar electron devices, each having two input electrodes and an output electrode, means for applying intelligence signals to one of the input electrodes of one of said devices, means for applying intelligence signals of opposite phase and lesser amplitude to the corresponding input electrode of the other of said devices, a sinusoidal carrier wave generator, means connected to said generator and the other input electrodes of said devices for delivering carrier signals substantially 180° apart in phase to said other input electrodes, and means connecting said output electrodes together and to a modulated signal output connection.

2. A modulator as claimed in claim 1 in which a pair of corresponding input electrodes of said devices are biased negatively for causing said devices to operate class A.

3. A modulator for restricted bandwidth signalling systems, comprising a pair of electron discharge devices, each having a cathode, an anode, a first control grid between said cathode and anode, and a second control grid between said first control grid and said anode, means grounding said cathodes, means negatively biasing said first control electrodes for causing said devices to operate class A, an intelligence signal input connection connected to one of said first control grids, a phase splitter and an attenuator connected in series between said input connection and the other of said first control grids for applying intelligence signal of opposite phase and lesser amplitude thereto, a sinusoidal carrier wave generator, means connected to said generator and to said second grids for delivering carriers 180° apart in phase to said other grids, and means connecting said anodes together and to a modulated signal output connection.

4. A partially doubly balanced modulator for restricted bandwidth signalling systems, comprising a pair of similar electron discharge devices, each having a cathode, an anode and a pair of spaced apart grids between said cathode and anode, means connecting said cathodes to ground, means negatively biasing a grid of each of said devices for causing said devices to operate class A, an intelligence signal input connection connected to one grid of one of said devices, a phase splitter and an attenuator connected in series between said input connection and one grid of the other of said devices for applying intelligence signal of opposite phase and lesser amplitude thereto, a sinusoidal carrier wave generator, means connected to said generator and to the other grids of said devices for delivering carriers 180° apart in phase to said other grids, and means connecting said anodes together and to a modulated signal output connection.

5. In a restricted bandwidth signalling system, first and second similar amplifiers each having an output circuit and first and second signal input circuits, said amplifiers each being responsive to first and second input signals applied respectively to said first and second input circuits to produce sideband signals corresponding to modulation of one of said input signals by the other and to simultaneously reproduce both said first and second input signals, means for providing a carrier signal comprising a substantially sinusoidal voltage wave having a predetermined fundamental frequency $w_s$, means for applying said carrier wave in phase opposition and substantially equal amplitude to the second input circuits of said amplifiers, a source of intelligence signals which include at least one low frequency component having a frequency $w_L$ and at least one high frequency component having a frequency $w_H$ with $w_L$ and $w_H$ being respectively lower and higher than $w_s/2$, phase splitting means coupled to said source to provide like intelligence signals in 180° out of phase relation, means for decreasing the amplitude of one of said out of phase intelligence signals relative to the other, means for applying said out of phase intelligence signals of unequal amplitude respectively to the first input circuits of said first and second amplifiers, a common load for said amplifiers, means coupling the output circuits of both said amplifiers in parallel to said common load for combining the outputs of said amplifiers in additive relation so that the modulation sidebands are added, the reproduced carrier signals are canceled and the unequal amplitude intelligence signals are subtracted to produce a remnant intelligence signal corresponding to the difference in amplitudes of the input intelligence signals, bandpass filtering means coupled to said common load and having a high frequency cutoff at $w_s/2$ for attenuating sideband components and remnant intelligence signal components have frequencies exceeding $w_s/2$ and for producing restricted bandwidth composite signals including said intelligence component $w_L$ and at least one sideband component having a frequency equal to $w_s$ minus $w_H$.

6. In a reduced bandwidth signalling system, a pair of similar electron valve devices each having a cathode, an anode and a plurality of control electrodes, means for providing a carrier signal comprising a sinusoidal voltage wave having a predetermined frequency $w_s$, means for applying said carrier signal in phase opposition and substantially equal amplitude to like control electrodes of said valve devices, a source of intelligence signals which include at least one low frequency intelligence component having a frequency $w_L$ and at least one high frequency intelligence component having a frequency $w_H$ with the said frequencies $w_L$ and $w_H$ being respectively lower and higher than $w_s/2$, means for applying said intelligence signals in phase opposition and with substantially unequal amplitudes to corresponding control electrodes of each of said valve devices, a common output circuit coupled between the anode and cathode of both said devices and including a low pass filter means for deriving a reduced bandwidth composite signal including said low frequency intelligence component $w_L$ and at least one carrier wave sideband component having a frequency equal to $w_s$ minus $w_H$, and means coupled to said output circuit for transmitting said composite signal within a restricted bandwidth signalling channel having a bandwidth of the order of $w_s/2$.

7. In a television signal-transmission bandwidth-reduction apparatus, a source of video signals including coarse video components having frequencies less than a predetermined frequency $w_s/2$ and fine detail video components having frequencies exceeding said predetermined frequency $w_s/2$; a partially doubly balanced modulator comprising a pair of electric valve devices each having first and second electrodes constituting terminals of a principal current path through the device and a third electrode functioning as a control electrode, means connecting said first electrodes to a point of reference potential, means for applying said video signals to the control electrode of one of said devices, means for applying said video signals in opposite phase and with lesser amplitude to the control electrode of the other of said devices, means for producing a sinusoidal carrier wave having a predetermined frequency $w_s$, means for applying said carrier wave to said valve devices in substantially 180° out-of-phase relation to oppositely modulate the conductivities of said principal current paths; low pass filter means coupling both said second electrodes to a common output circuit to produce thereacross a reduced bandwidth composite video signal including said coarse video components and at least one carrier wave sideband component having a frequency equal to $w_s$ minus $w_H$, wherein $w_H$ represents the frequency of one of said fine detail video components, and means coupled to said filter means for conveying said composite video signal within a bandwidth of the order of $w_s/2$.

References Cited in the file of this patent

UNITED STATES PATENTS

| | | |
|---|---|---|
| 2,171,151 | Urtel | Aug. 29, 1939 |
| 2,719,955 | Thompson | Oct. 4, 1955 |
| 2,775,738 | Schlesinger | Dec. 25, 1956 |